US007173513B2

(12) United States Patent
Laaser

(10) Patent No.: US 7,173,513 B2
(45) Date of Patent: Feb. 6, 2007

(54) ELECTRICAL APPLIANCE WITH COMMUNICATION INTERFACE

(75) Inventor: Walter Laaser, Laaber (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 624 days.

(21) Appl. No.: 10/627,905

(22) Filed: Jul. 25, 2003

(65) Prior Publication Data

US 2004/0018827 A1 Jan. 29, 2004

Related U.S. Application Data

(63) Continuation of application No. PCT/EP02/00730, filed on Jan. 24, 2002.

(30) Foreign Application Priority Data

Jan. 25, 2001 (DE) ................................ 101 03 302

(51) Int. Cl.
*G05B 23/02* (2006.01)
*G08C 19/00* (2006.01)
*G08B 21/00* (2006.01)

(52) U.S. Cl. ....................... 340/3.1; 340/540; 340/679; 340/825.69

(58) Field of Classification Search ................. 340/3.1, 340/310.16, 310.18
See application file for complete search history.

(56) References Cited

U.S. PATENT DOCUMENTS 4,837,414 A * 6/1989 Edamula ................ 340/825.22
5,285,375 A * 2/1994 Kim .............................. 700/1
5,839,097 A 11/1998 Klausner
6,587,739 B1 * 7/2003 Abrams et al. ........ 340/310.11
6,731,201 B1 * 5/2004 Bailey et al. .......... 340/310.11
6,906,617 B1 * 6/2005 Van der Meulen ........... 340/3.1
2003/0109938 A1 * 6/2003 Daum et al. ................. 340/3.1

FOREIGN PATENT DOCUMENTS

| | | | |
|---|---|---|---|
| DE | 37 88 348 | T2 | 2/1989 |
| DE | 694 26 578 | T2 | 10/1994 |
| DE | 196 15 358 | A1 | 11/1996 |
| DE | 196 15 840 | A1 | 10/1997 |
| EP | 0 301 127 | B1 | 2/1989 |
| EP | 0 619 569 | B1 | 10/1994 |
| GB | 2 265 158 | A | 9/1993 |

* cited by examiner

*Primary Examiner*—Wendy R. Garber
*Assistant Examiner*—Clara Yang
(74) *Attorney, Agent, or Firm*—Laurence A. Greenberg; Werner H. Stemer; Ralph E. Locher

(57) ABSTRACT

An electrical appliance includes at least one sensor for recording at least one operating parameter and at least one actuator for influencing at least one operating parameter of the electrical appliance. The at least one sensor and the at least one actuator are conductively coupled with a central computing and control unit for controlling the electrical appliance. The central computing and control unit is coupled with a communication unit that allows a wireless communication with an external remote station. The communication unit is, preferably, a transponder for wireless radio communication.

6 Claims, 1 Drawing Sheet

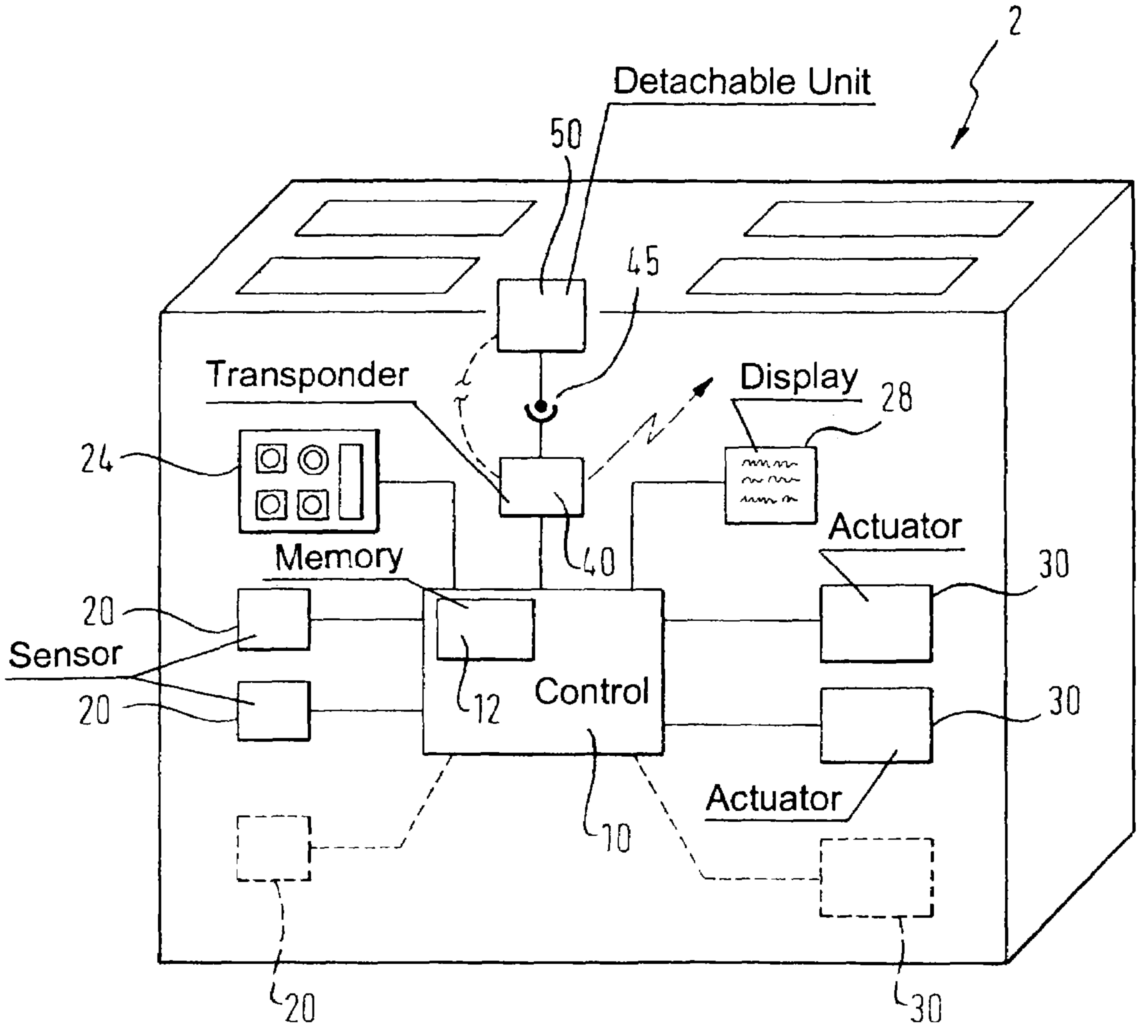
2
Detachable Unit
50
45
Transponder
Display
28
24
40
Memory
Actuator
30
20
Sensor
20
12
Control
30
Actuator
10
20
30

ELECTRICAL APPLIANCE WITH COMMUNICATION INTERFACE

CROSS-REFERENCE TO RELATED APPLICATION

This application is a continuation of copending International Application No. PCT/EP02/00730, filed Jan. 24, 2002, which designated the United States and was not published in English.

BACKGROUND OF THE INVENTION

Field of the Invention

The invention relates to an electrical appliance with a communication interface having at least one sensor for recording at least one operating parameter of the electrical appliance and at least one actuator for influencing at least one operating parameter of the electrical appliance.

In the assembly line production of electrical household appliances, the storing of production data in a database of a production control unit for production control purposes is known. Such a production control unit is, typically, provided with a central database for all monitoring and controlling of production. In these known methods, after each production station of the individual appliances, the production data that are stored in the database are attached to each device on a respective barcode. These barcodes can, then, be scanned by an optical scanner and read out, in order to be able to transmit the current production status of the device at any time to the next production station or the central database.

This simple and reliable method of storing relevant production data and parameters, which is also relatively inflexible, is increasing being replaced by the use of transponders during production control. In the modern production of electrical appliances, these, like many other more complex devices such as motor vehicles, are provided with a transponder during production, which is utilized for flexible production control. Transponders, such as these that are utilized for production control, typically include a radio receiver, an internal memory, and a radio transmitter. The transmitter typically transmits on a different radio frequency than the receiver to guarantee interference-free operation. All relevant production data are stored in the memory of the transponder. The transponder can also remain at the device after assembly is complete to ensure that the production data stored there are available and can be fetched over a radio connection should it be necessary for repair or service purposes.

Known electrical household appliances according to the available prior art are, typically, furnished with an electronic control by which signals from sensors can be evaluated, and specified actions can be carried out depending on the received sensor signals and user inputs. The central computing and control unit of the electronic control is typically connected to an internal memory in which various control programs can be stored. It is also useful to employ such a memory for error storage, i.e., function errors or detected invalidities are stored there for later transmission of the error data and error parameters to a service computer. This communication can occur either over a wire-bound path, for instance, by coupling a portable service computer with the electrical appliance, or over a wireless path, for instance, by radio communication of the error parameters to a nearby or distant radio receiver.

SUMMARY OF THE INVENTION

It is accordingly an object of the invention to provide an electrical appliance with communication interface that overcomes the hereinafore-mentioned disadvantages of the heretofore-known devices of this general type and that makes available a universal communication interface for an electrical household appliance.

With the foregoing and other objects in view, there is provided, in accordance with the invention, an electrical appliance, including at least one sensor for recording at least one operating parameter of the electrical appliance, at least one actuator for influencing at least one operating parameter of the electrical appliance, a communication unit having a transponder for wireless radio transmission and communication at least with an external remote station, a central computing and control unit for controlling the electrical appliance, the central computing and control unit being conductively coupled to the at least one sensor, to the at least one actuator, and to the communication unit, a housing, the central computing and control unit, the at least one sensor, the at least one actuator, and the communication unit being disposed at the housing, an operating unit being detachably connected to the housing, and the transponder being coupled with the operating unit, communicating with the operating unit, and transmitting relevant device data with the operating unit while the operating unit is detached from the housing.

As such, production data of the electrical appliance can be permanently accessed during its production, and, in addition, a wireless communication with service remote stations or the like is possible during later operation of the appliance. The transponder can, thus, be utilized for production control and monitoring during the production of the electrical appliance and for communication with a service station during its operation.

The communication unit, i.e., the transponder, can be coupled with an additional operating unit that is detachably connected with the electrical appliance, and that can communicate with the transponder and send it relevant device data when the operating unit is not connected to the appliance. As such, remote controlling of the appliance as well as data communication between the operating unit and the external computer are possible. The data so transferred to the operating unit can be transmitted to the central computing and control unit of the appliance when the operating unit is re-inserted into its specially provided shaft. Accordingly, program updates can be executed at any time without any problem.

In accordance with another feature of the invention, the operating unit can also serve as a removable remote control unit for the user during operation, whereby it can also influence the appliance at any time from a distant location. This is easier when the operating unit is provided with a status display.

In accordance with a further feature of the invention, the electrical appliance can be integrated in a home automation network. In such a case, the usual cable connections for communication connections between various units of this network are unnecessary because all relevant data can be exchanged through transponder.

In accordance with an added feature of the invention, the transponder monitors production control during production of the electrical appliance.

In accordance with an additional feature of the invention, the transponder communicates with a service station during operation of the electrical appliance.

In accordance with yet another feature of the invention, the transponder communicates with a service station during operation of the electrical appliance, and the central computing and control unit receives a software update transmitted by the service station during operation of the electrical appliance.

In accordance with yet a further feature of the invention, the operating unit has a status display for providing status information to a user.

In accordance with a concomitant feature of the invention, the operating unit is a detachable operating and control unit for operation and control of the electrical appliance by a user.

Other features that are considered as characteristic for the invention are set forth in the appended claims.

Although the invention is illustrated and described herein as embodied in an electrical appliance with communication interface, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

The FIGURE is a block and schematic circuit diagram illustrating basic functions of the electrical appliance according to the invention.

DESCRIPTION OF THE PREFERRED EMBODIMENTS

Referring now to the single FIGURE of the drawing, a block wiring diagram illustrates the basic functions of the inventive electrical appliance 2. This electrical household appliance 2 is provided with a central computing and control unit 10, which is provided with electrical inputs for several sensors 20 and electrical outputs for several actuators 30. The sensor 20 can be a temperature sensor in an electrical stove or a flow sensor in a washing machine, for example. In this context, an actuator 30 is any electrically actuatable component that influences or represents a function in the appliance. Such an actuator 30 can be a hotplate of an electrical stove, a water pump, or an electrical heating element of a washing machine.

A memory 12 that is allocated to the central computing and control unit 10 is also represented. This memory 12 can be optionally realized as an internal memory and, thus, as an integral component of the computing and control unit 10. But the memory can also be an external memory that is separate from the central computing and control unit 10. However, for the sake of simplicity, this memory will still be referred to hereinafter as internal memory 12.

The central computing and control unit 10 is further provided with at least one control panel 24 with which user inputs are communicated to the central computing and control unit 10. The control panel 24 can include several pushable or rotatable keys or switches by which different functions or programs can be selected at the electrical appliance. Instead of, or in additional to, the control panel 24, an interface may be provided, through which it is possible to realize an external drive capability or communication of the electrical appliance with a household installation network or the like. A display field 28 that is coupled with the central computing and control unit 10 serves for giving the user a status indication at any time during the operation. The display field 28 can be constructed as a numeric display, a bar graph display, or a graphic display, according to reading convenience. Errors or particular error codes may also be displayed over the display field so that a user is informed given malfunctions and can give a technician the information if necessary. The central computing and control unit 10 also includes an electrical connection to an inventive communication interface.

Also connected to the central computing and control unit 10 is a transponder 40, which is provided with a radio receiver, a radio transmitter, and, potentially, its own internal memory, and which is, therefore, capable of letting the central computing and control unit 10 communicate with an external station. Any error that is detected in the central computing and control unit 10 can be transmitted to the internal memory unit 12 and stored there so that it can be transferred at the desired time to the transponder 40 and sent from there to an external receiving and transmitting station through radio.

The inventive communication interface of the electrical appliance 2 in the form of the transponder 40 can assume operation even during the assembly line production of the appliance with the storing of relevant production data and parameters on an internal memory of the transponder 40. An electrical connection between transponder 40 and central computing and control unit 10 can, then, be set up in the course of further assembly, whereupon the data stored in the memory of the transponder 40 can be transferred to the internal memory 12 of the computing and control unit 10. In the later operating of the electrical appliance 2, an unrestricted communication between the central computing and control unit 10 and the transponder 40 is possible. As a result, the transponder 40 can function as a universal wireless or radio communication interface to external communication partners.

With such a configuration, it is possible to transmit device data, error parameters, sensor values, and so on to an external receiver, as well as to receive data from an external transmitter. These received data can be new program versions or control signals of a home automation control.

In another preferred development of the invention, an additional detachable operating unit 50 is provided, which is connected either to the transponder 40 over a plug connection 45, as represented in the figure, or directly to the central computing and control unit 10 by a plug connection. This detachable operating unit 50 is, advantageously, constructed as an additional radio transceiver that can communicate with the transponder 40 and, thus, also with the central computing and control unit 10 even in the detached condition. It can, thus, function as a detachable operation control and/or status display at any time.

With the plug connection 45, the external operating unit 50 can be inserted into a corresponding non-illustrated insertion shaft in the electrical appliance 2. This insertion shaft can be easily accessible for the operator, for instance, being located in the front side of the housing, preferably, beneath a flap. For the external operating unit 50 to be able to secure the data stored therein for a defined period, it must be provided with an additional autonomous current supply, for instance, in the form of a capacitor that is permanently charged when the operating unit 50 is in the inserted condition. Instead of the capacitor, the same function can also be performed by an accumulator element, which is also connected to a current supply in the inserted condition of the operating unit 50.

It is also possible to furnish the operating unit 50 with a universal plug contact with which a plug connection to a service computer, from which a program update can be transmitted, can be produced at any time. All data can, then, be transmitted into the central computing and control unit 10 upon insertion of the operating unit 50 into the plug connection 45 of the electrical appliance 2.

The present invention involves an electrical appliance with a universal communication interface, whereby a transponder that is already present for production control is integrated in an electronic control of the electrical appliance and can serve not only for identification and documentation of the appliance but also for communication with external users.

The features of the invention that are disclosed in the above description, the drawings, and the patent claims, can be of importance, individually as well as in any combination, for realizing the invention in its various developments. The invention is not limited to the above-described preferred exemplifying embodiment. Rather, a number of variants and modifications are imaginable that make use of the inventive idea and, therefore, also fall within the scope of protection.

I claim:

1. An electrical appliance, comprising:

at least one sensor for recording at least one operating parameter of the electrical appliance;

at least one actuator for influencing at least one operating parameter of the electrical appliance;

a communication unit having a transponder for wireless radio transmission and communication at least with an external remote station, said transponder monitoring production control during production of the electrical appliance;

a central computing and control unit for controlling the electrical appliance, said central computing and control unit being electrically coupled to said at least one sensor, to said at least one actuator, and to said communication unit;

a housing, said central computing and control unit, said at least one sensor, said at least one actuator, and said communication unit being disposed at said housing;

an operating unit being detachably connected to said housing; and said transponder being coupled with said operating unit, communicating with said operating unit, and transmitting relevant device data with said operating unit while said operating unit is detached from said housing.

2. The appliance according to claim 1, wherein said transponder communicates with a service station during operation of the electrical appliance.

3. The appliance according to claim 2, wherein:

said transponder communicates with a service station during operation of the electrical appliance; and said central computing and control unit receives a software update transmitted by the service station during operation of the electrical appliance.

4. The appliance according to claim claim 1, wherein:

said transponder communicates with a service station during operation of the electrical appliance; and said central computing and control unit receives a software update transmitted by the service station during operation of the electrical appliance.

5. The appliance according to claim 1, wherein said operating unit has a status display for providing status information to a user.

6. The appliance according to claim 1, wherein said operating unit is a detachable operating and control unit for operation and control of the electrical appliance by a user.

* * * * *